United States Patent
Enomoto

(10) Patent No.: US 11,657,167 B2
(45) Date of Patent: May 23, 2023

(54) AUTHENTICATION SYSTEM, AUTHENTICATION DEVICE, AUTHENTICATION TARGET DEVICE AND IMAGE FORMING APPARATUS

(71) Applicant: CANON KABUSHIKI KAISHA, Tokyo (JP)

(72) Inventor: Hisashi Enomoto, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 16/511,274

(22) Filed: Jul. 15, 2019

(65) Prior Publication Data
US 2020/0034554 A1 Jan. 30, 2020

(30) Foreign Application Priority Data
Jul. 27, 2018 (JP) .............................. JP2018-141631

(51) Int. Cl.
*G06F 21/60* (2013.01)
*H04W 12/06* (2021.01)
(Continued)

(52) U.S. Cl.
CPC ............ *G06F 21/608* (2013.01); *G06F 21/31* (2013.01); *H04L 9/3247* (2013.01); *H04W 12/06* (2013.01)

(58) Field of Classification Search
CPC ......... G06F 21/31; G06F 21/608; H04L 9/32; H04L 9/3247; H04W 12/06
See application file for complete search history.

(56) References Cited

U.S. PATENT DOCUMENTS 6,697,946 B1 * 2/2004 Miyaji .................. H04L 9/3066
713/180
6,859,535 B1 * 2/2005 Tatebayashi ..... G11B 20/00528
380/201
(Continued)

FOREIGN PATENT DOCUMENTS

| JP | 2003084631 A | 3/2003 |
| JP | 2009163208 A | 7/2009 |
| JP | 2013062780 A | 4/2013 |

OTHER PUBLICATIONS

H. K. Lu and A. Ali, "Communication Security between a Computer and a Hardware Token," Third International Conference on Systems (icons 2008), Cancun, Mexico, 2008, pp. 220-225. (Year: 2008).*

(Continued)

*Primary Examiner* — Kari L Schmidt
(74) *Attorney, Agent, or Firm* — Venable LLP

(57) ABSTRACT

The authentication device holds first data and second data, the first data to authenticate the authentication target device of a version from a first version same as the authentication device to a second version newer than the first version, the second data to authenticate the authentication target device of a version newer than the second version. The authentication target device holds a plurality pieces of first target data and second target data, the plurality pieces of first target data corresponding to each of versions from a third version same as the authentication target device to a fourth version older than the third version, one second target data corresponding to each of versions from a fifth version to a sixth version, the fifth version being older than the fourth version by one version, the sixth version being older than the fifth version.

11 Claims, 5 Drawing Sheets

(51) Int. Cl.
*G06F 21/31* (2013.01)
*H04L 9/32* (2006.01)

(56) References Cited

U.S. PATENT DOCUMENTS

| | | | |
|---|---|---|---|
| 8,724,135 B2 | 5/2014 | Misumi | |
| 9,878,555 B2* | 1/2018 | Ward | H04L 9/3271 |
| 10,305,892 B2* | 5/2019 | Shin | B41J 2/17546 |
| 11,020,976 B2* | 6/2021 | Ward | G06F 21/445 |
| 11,328,098 B2* | 5/2022 | Marinet | G06F 21/72 |
| 2004/0073518 A1* | 4/2004 | Atkinson | G07F 7/08 |
| | | | 705/65 |
| 2005/0172132 A1* | 8/2005 | Chen | H04L 9/0816 |
| | | | 713/180 |
| 2009/0175632 A1* | 7/2009 | Kim | G03G 15/0863 |
| | | | 399/12 |
| 2011/0211850 A1 | 9/2011 | Kim | |
| 2011/0225409 A1* | 9/2011 | Sibert | G06F 21/575 |
| | | | 713/2 |
| 2012/0291019 A1 | 11/2012 | Enomoto | |
| 2013/0070279 A1 | 3/2013 | Misumi | |
| 2014/0169803 A1* | 6/2014 | Lee | G03G 15/55 |
| | | | 399/12 |
| 2016/0135045 A1* | 5/2016 | Lee | H04L 9/0833 |
| | | | 726/9 |
| 2017/0208059 A1* | 7/2017 | Shin | H04L 63/0853 |
| 2017/0230540 A1* | 8/2017 | Sasaki | G03G 21/1892 |
| 2018/0131677 A1* | 5/2018 | Brickell | H04L 63/061 |
| 2022/0004121 A1* | 1/2022 | Park | G03G 15/5075 |

OTHER PUBLICATIONS

Erik Solum, et al. Modular over-the-wire configurable security for long-lived critical infrastructure monitoring systems. In Proceedings of the Third ACM International Conference on Distributed Event-Based Systems (DEBS '09). Association for Computing Machinery, New York, NY, USA, Article 13, 1-9. (Year: 2009).*

* cited by examiner

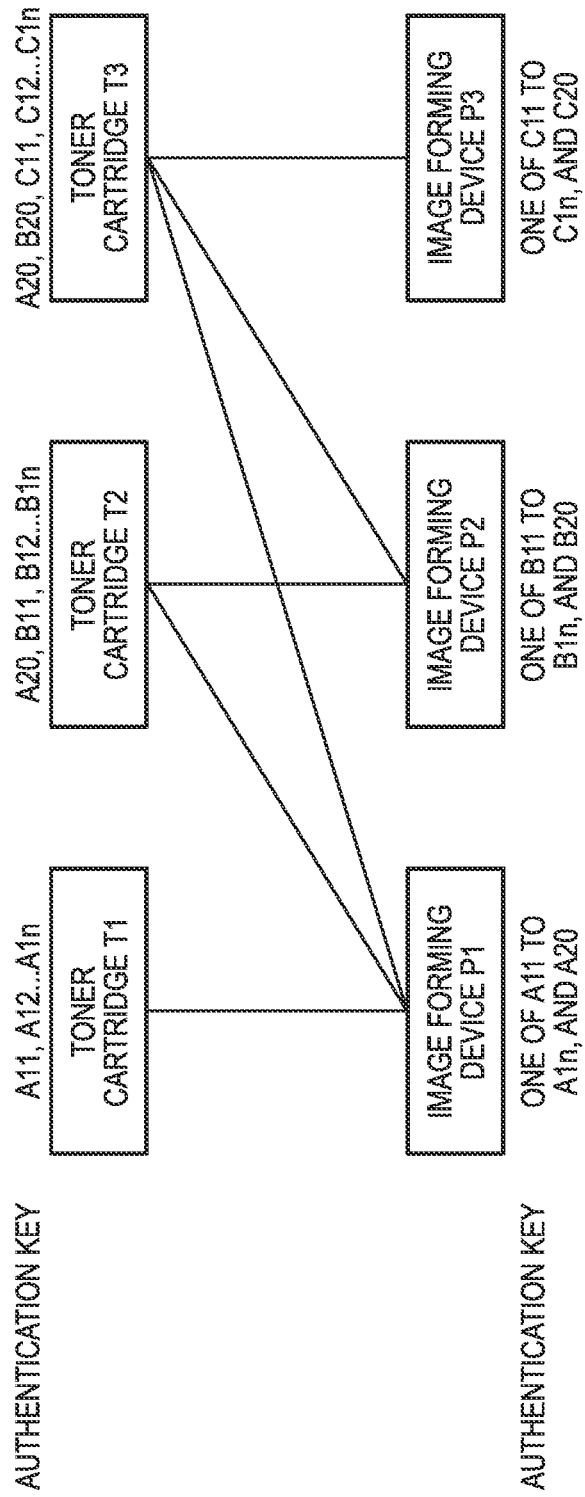

FIG. 4A

| TONER CARTRIDGE T2 ||
|---|---|
| NON-PUBLIC MEMORY 203 | PUBLIC MEMORY 204 |
| S_T2_A20<br>S_T2_B11<br>. . .<br>S_T2_B1n | O_T2_A20<br>O_T2_B11<br>. . .<br>O_T2_B1n<br>Sig |

FIG. 4B

| IMAGE FORMING DEVICE P1 ||
|---|---|
| NON-PUBLIC MEMORY 203 | PUBLIC MEMORY 204 |
| S_P1_A20<br>S_P1_A1i | A20_ID<br>A1i_ID |

FIG. 4C

| IMAGE FORMING DEVICE P2 ||
|---|---|
| NON-PUBLIC MEMORY 203 | PUBLIC MEMORY 204 |
| S_P2_B20<br>S_P2_B1i | B20_ID<br>B1i_ID |

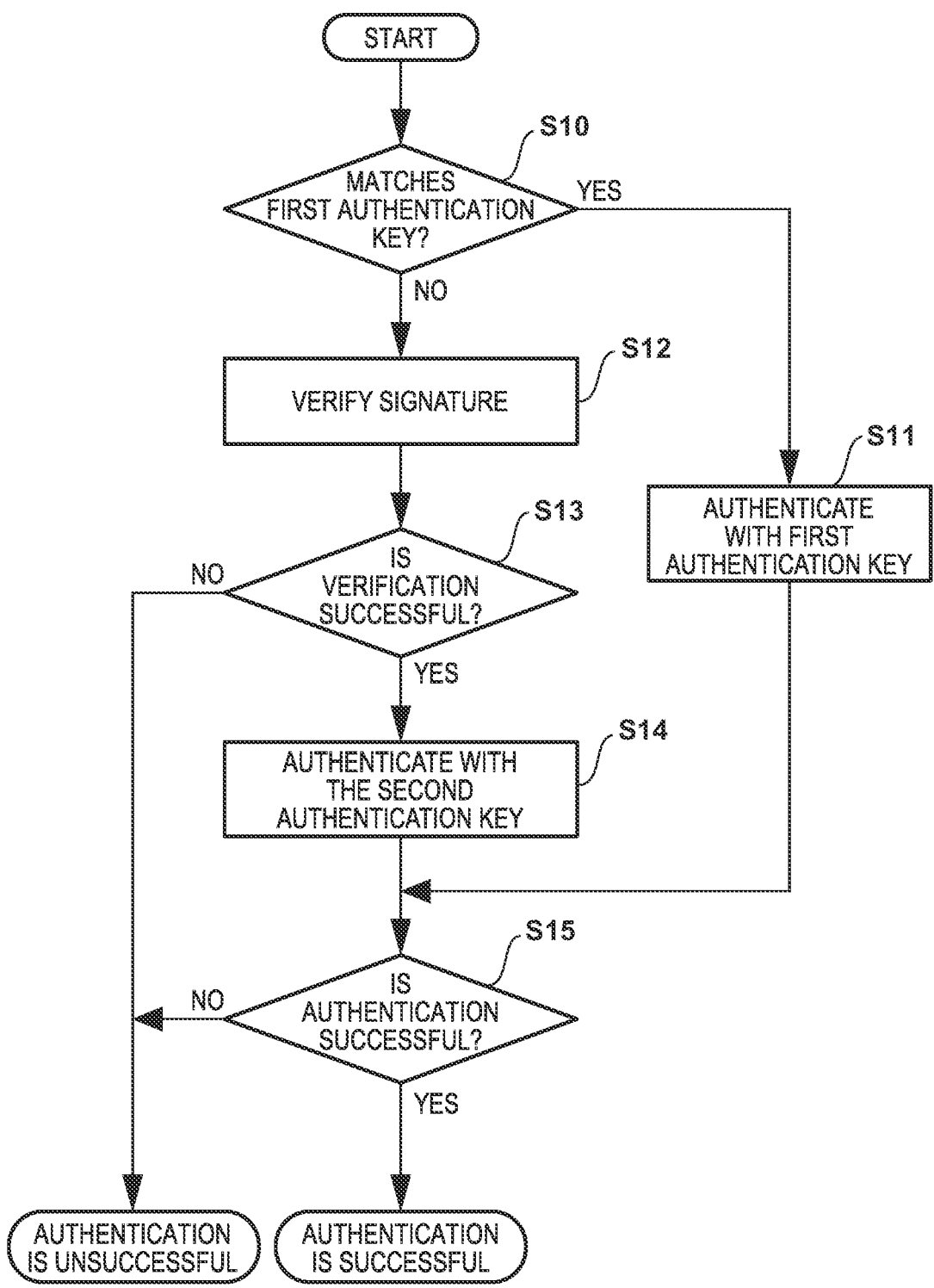

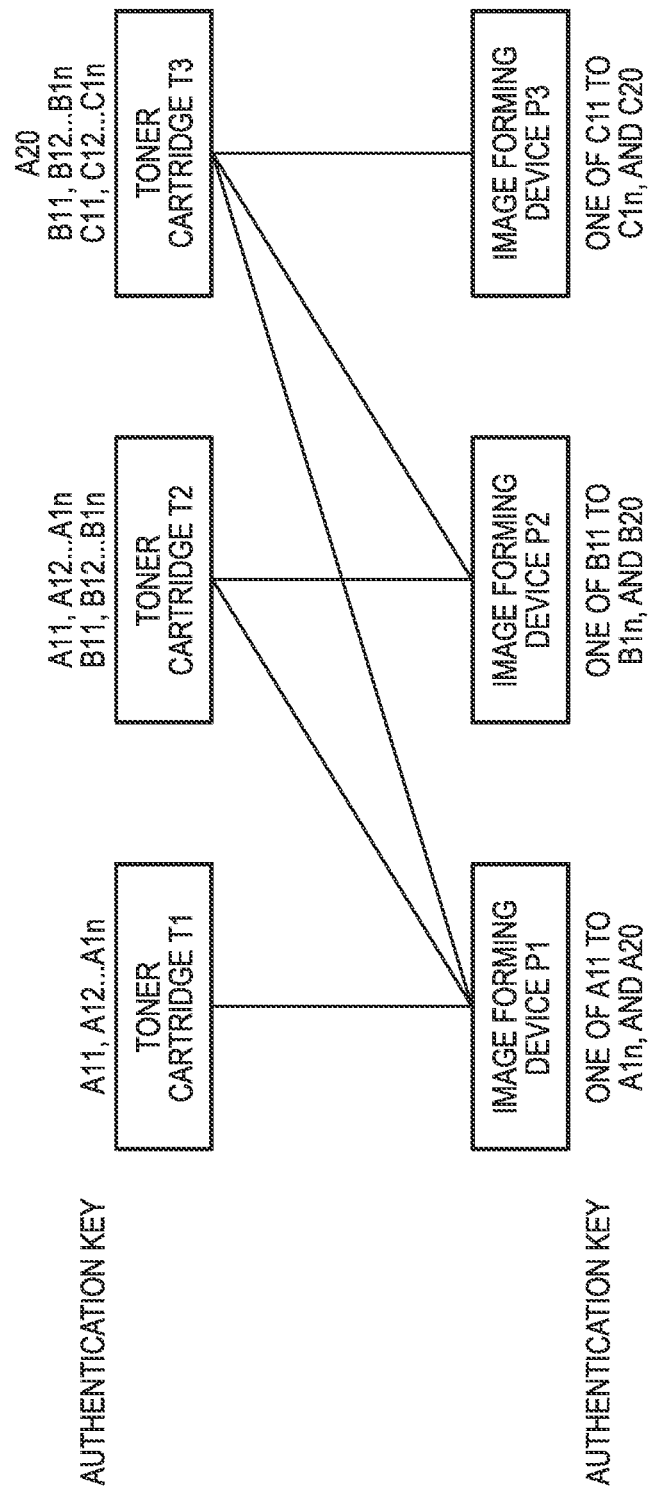

AUTHENTICATION SYSTEM, AUTHENTICATION DEVICE, AUTHENTICATION TARGET DEVICE AND IMAGE FORMING APPARATUS

BACKGROUND OF THE INVENTION

Field of the Invention

The present invention relates to a technique of authenticating an authentication target device by an authentication device.

Description of the Related Art

US-2009-175632 discloses a method of authenticating a toner cartridge that is a replacement component with an image forming apparatus. Specifically, when a toner cartridge is mounted, the image forming apparatus authenticates the toner cartridge by reading the authentication information included in the toner cartridge and by comparing it with the authentication information included in the image forming apparatus. Also, US-2013-070279 discloses a configuration in which a plurality of secret keys are stored in each of an image forming apparatus and a cartridge, and one secret key to be used for authentication is selected in accordance with the use state of the image forming apparatus to perform the authentication of the cartridge on the basis of the selected secret key. Also, Japanese Patent Laid-Open No. 2003-084631 discloses a toner cartridge that can be shared among a plurality of different image forming apparatuses.

Consider a configuration in which a plurality pieces of secret data for authentication is stored in a toner cartridge that is an authentication target device to improve the security level. In this case, an image forming apparatus that is an authentication device authenticates the toner cartridge on the basis of one secret data of the plurality pieces of secret data stored in the toner cartridge. With such a configuration, the security level can be improved. However, continuous use of the same value as a plurality pieces of secret data increases the risk of leakage of the values of all the secret data over time.

On the other hand, commercially available image forming apparatuses are improving with the progress of times, and are released as new models, i.e., as image forming apparatuses of new versions. A replacement unit, such as a toner cartridge, can also be upgraded in accordance with a new version of the image forming apparatus when the version of the image forming apparatus is changed. As described above, continuous use of the same value as a plurality pieces of secret data can lead to leakage of the values of all the plurality pieces of secret data, and therefore the plurality pieces of secret data are typically changed at the time of the upgrade (at the generation change).

However, since the use period of the image forming apparatuses are longer than that of the replacement units, backward compatibility is required for the replacement units. That is, the replacement units are designed to be useable not only in an image forming apparatus of the same version, but also in image forming apparatuses of previous versions. When a replacement unit of a new version stores not only secret data for authentication with the image forming apparatus of the same version, but also a plurality pieces of secret data for authentication with image forming apparatuses of previous versions to ensure backward compatibility, the number of pieces of secret data to be stored in the replacement unit increases, thus increasing the cost of the replacement unit. Also, the security level may not be ensured since there is a high possibility of leakage of a plurality of secret data for authentication with the image forming apparatuses of previous versions.

SUMMARY OF THE INVENTION

According to an aspect of the present invention, an authentication system includes an authentication device and an authentication target device. The authentication device holds one first authentication secret data and one second authentication secret data, the one first authentication secret data to authenticate the authentication target device of a version from a first version that is the same as the authentication device to a second version newer than the first version, the one second authentication secret data to authenticate the authentication target device of a version newer than the second version; and the authentication target device holds a plurality pieces of first authentication target secret data and second authentication target secret data, the plurality pieces of first authentication target secret data corresponding to each of versions from a third version that is same as the authentication target device to a fourth version older than the third version and for authentication by the authentication device of a version from the third version to the fourth version, one second authentication target secret data corresponding to each of versions from a fifth version to a sixth version and for authentication by the authentication device of a version from the fifth version to the sixth version, the fifth version being older than the fourth version by one version, the sixth version being older than the fifth version.

Further features of the present invention will become apparent from the following description of exemplary embodiments with reference to the attached drawings.

BRIEF DESCRIPTION OF THE DRAWINGS

FIG. 3 is a diagram illustrating compatibility of an image forming apparatus and a toner cartridge according to one embodiment.

FIG. 4A is a diagram illustrating information held by a toner cartridge according to one embodiment.

FIGS. 4B and 4C are diagrams illustrating information held by an image forming apparatus according to one embodiment.

FIG. 5 is a flowchart of an authentication process according to one embodiment.

FIG. 6 is a diagram illustrating compatibility of an image forming apparatus and a toner cartridge according to one embodiment.

DESCRIPTION OF THE EMBODIMENTS

Figure 1:
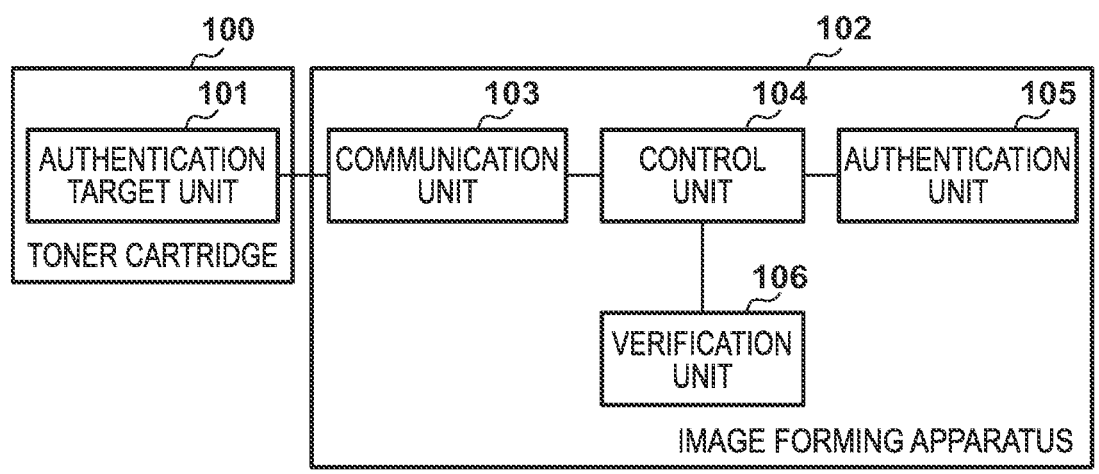
FIG. 1 is a configuration diagram of an authentication system according to one embodiment.

Embodiments of the present invention are described below with reference to the accompanying drawings. Note that the following embodiments are merely examples, and the present invention is not limited to the embodiments. Components that are not necessary for the description of the embodiment are omitted in the drawings.

First Embodiment

In the following description of the present embodiment, an electrophotographic image forming apparatus serves as an authentication device, and a toner cartridge, which is a replacement unit for the image forming apparatus, serves as an authentication target device. Note that the authentication target device is not limited to a toner cartridge, and the authentication target device may be any replacement unit that is detachable from the main body of the image forming apparatus, such as a unit including a photosensitive member, a unit including a fixing device, and a unit including an intermediate transfer belt. In addition, the authentication device is not limited to an electrophotographic image forming apparatus, and may be an inkjet image forming apparatus, for example. In this case, for example, an ink cartridge, which is a replacement unit, may be an authentication target device. Further, the present invention is not limited to a configuration in which an image forming apparatus and a replacement unit thereof serve as an authentication device and an authentication target device, respectively, and the present invention may be applied to any device and a replacement unit of the device.

FIG. 1 is a configuration diagram of an authentication system according to the present embodiment. A toner cartridge 100 (hereinafter also referred to as a cartridge), which is an authentication target device, includes an authentication target unit 101 described later. The authentication target unit 101 is an integrated circuit (IC) such as a memory tag, for example. The cartridge 100 is a replacement unit for an image forming apparatus 102, which is an authentication device, and the cartridge 100 is mounted on or attached to the image forming apparatus 102 when in use. A communication unit 103 of the image forming apparatus 102 communicates with the authentication target unit 101 of the mounted cartridge 100. The control unit 104 controls the entire image forming apparatus 102. The control unit 104 authenticates the mounted cartridge 100 and determines whether the cartridge 100 is an authorized item. The image forming apparatus 102 includes an authentication unit 105 and a verification unit 106 described later. The authentication unit 105 is an integrated circuit (IC) such as a memory tag, for example.

Figure 2:
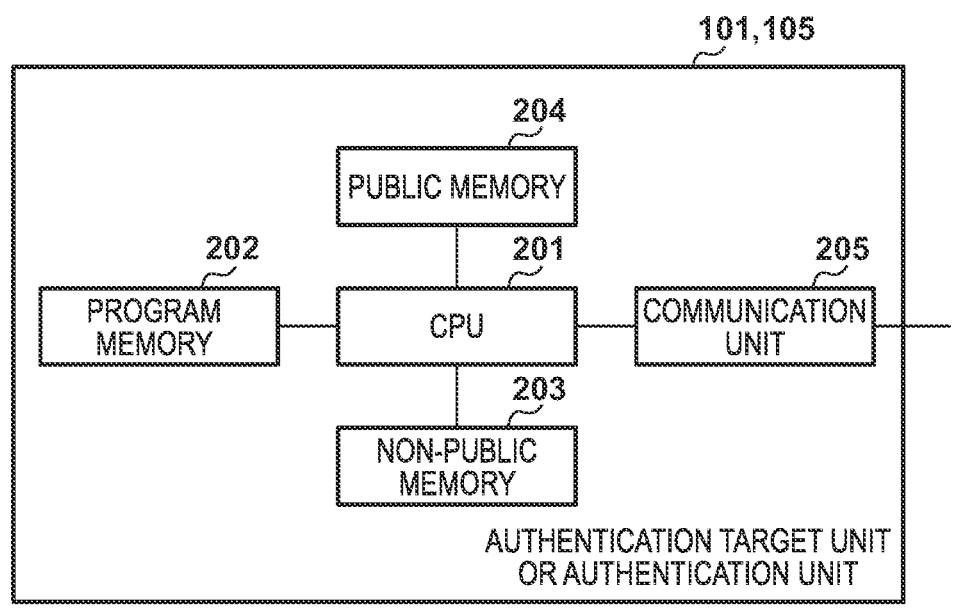
FIG. 2 is a configuration diagram of an authentication unit and authentication target unit according to one embodiment.

The configurations of the authentication target unit 101 and the authentication unit 105 are identical, and the configurations are illustrated in FIG. 2. A program memory 202 stores a program configured to be executed by a CPU 201. A non-public memory 203 stores secret data. The data stored in the non-public memory 203 cannot be read from the outside of the authentication target unit 101/authentication unit 105. The public memory 204 stores externally readable data. The communication unit 205 communicates with the communication unit 103 of the image forming apparatus 102 in the authentication target unit 101 and communicates with the control unit 104 in the authentication unit 105. Note that the program memory 202, the non-public memory 203, and the public memory 204 may be physically different memories or physically the same memory.

Hereinafter, it is assumed that the image forming apparatus 102 includes image forming apparatuses of three versions, P1, P2, and P3 as illustrated in FIG. 3. For example, the image forming apparatus P2 is a succeeding version of the image forming apparatus P1, and the image forming apparatus P3 is a succeeding version of the image forming apparatus P2. Likewise, it is assumed that the cartridge 100 includes cartridges of three different versions, T1, T2 and T3 as illustrated in FIG. 3. For example, the cartridge T1 is released with the image forming apparatus P1, the cartridge T2 is released with the image forming apparatus P2, and the cartridge T3 is released with the image forming apparatus P3. In the following description, the image forming apparatus P1 and the cartridge T1 are of a version A, the image forming apparatus P2 and the cartridge T2 are of a version B, and the image forming apparatus P3 and the cartridge T3 are of a version C.

As described above, the cartridge 100, which is a consumable item, has backward compatibility. That is, the cartridge T2 is designed to be usable not only in the co-released image forming apparatus P2, but also in the previously released image forming apparatus P1. Likewise, the cartridge T3 is designed to be usable not only in the co-released image forming apparatus P3, but also in the previously released image forming apparatuses P1 and P2. The straight lines illustrated in FIG. 3 indicate compatibility of the cartridge 100 and the image forming apparatus 102. In the present example, the cartridge T1 can be used only in the image forming apparatus P1. The cartridge T2 can be used in the image forming apparatuses P1 and P2, but cannot be used in the image forming apparatus P3. The cartridge T3 can be used in the image forming apparatuses P1, P2, and P3.

FIG. 3 also illustrates authentication keys stored in the image forming apparatus 102 and the cartridge 100. Note that in the present embodiment, the authentication key is a generic term of authentication target secret data and authentication target public data stored in the cartridge 100 as described later, and authentication secret data stored in the image forming apparatus 102. That is, there are authentication target secret data, authentication target public data and authentication secret data that correspond to one authentication key, and the authentication target secret data and the authentication target public data are stored in the cartridge 100 whereas the authentication secret data is stored in the image forming apparatus 102. In the following description, the phrase that an authentication key is stored in the image forming apparatus 102 and/or the cartridge 100 means that secret data corresponding to the authentication key is stored in the image forming apparatus 102 and/or the cartridge 100.

As illustrated in FIG. 3, in this embodiment, the cartridge T1 of the version A stores a total of n authentication keys, A11 to A1$n$. The cartridge T2 stores a total of (n+1) authentication keys, B11 to B1$n$ and A20. The cartridge T3 stores a total of (n+2) authentication keys, C11 to C1$n$, A20, and B20. The image forming apparatus P1 stores two authentication keys, namely, one authentication key (selected authentication key) selected from the authentication keys A1 to A1$n$, and A20. The image forming apparatus P2 stores two authentication keys, namely, an authentication key (selected authentication key) of any one of B1 to B1$n$, and B20. The image forming apparatus P3 stores two authentication keys, namely, an authentication key (selected authentication key) of any one of C1 to C1$n$, and C20.

Thus, the image forming apparatus P1 uses an authentication key A1$i$ (where i is an integer from 1 to n) in authentication when the cartridge T1 is mounted. The image forming apparatus P2 uses an authentication key B1$i$ in authentication when the cartridge T2 is mounted, and the image forming apparatus P3 uses an authentication key C1$i$ in authentication when the cartridge T3 is mounted. In the following description, the authentication key that can be used when the cartridge 100 of the same version is attached to the image forming device 102 is referred to as a first authentication key. That is, the authentication keys A1 to A1$n$ are the first authentication key of the version A, the authentication keys B11 to B1$n$ are the first authentication key of the version B and the authentication keys C1 to C1$n$ are the first authentication key of the version C.

The image forming apparatus P1 uses the authentication key A20 in authentication when the cartridge T2 or T3 is mounted. The image forming apparatus P2 uses the authentication key B20 in authentication when the cartridge T3 is mounted. In the following description, the authentication key that is used when the cartridge 100 of a version newer than that of the image forming apparatus 102 is mounted in the image forming apparatus 102 is referred to as a second authentication key. That is, the authentication key A20 is the second authentication key of the version A, the authentication key B20 is the second authentication key of the version B, and the authentication key C20 is the second authentication key of the version C.

FIG. 4A illustrates information stored in the non-public memory 203 and the public memory 204 of the authentication target unit 101 of the cartridge T2. The non-public memory 203 of the cartridge T2 stores the authentication target secret data for each of the authentication keys A20 and B11 to B1n. Hereinafter, as illustrated in FIG. 4A, the authentication target secret data corresponding to the authentication key A20 held by the cartridge T2 is referred to as S_T2_A20. In addition, the authentication target secret data corresponding to the authentication key B1k (k is an integer from 1 to n) held by the cartridge T2 is referred to as S_T2_B1k. The public memory 204 of the cartridge T2 stores authentication target public data for each of the authentication keys A20 and B11 to B1n. Hereinafter, as illustrated in FIG. 4A, the authentication target public data corresponding to the authentication key A20 held by the cartridge T2 is referred to as O_T2_A20, and the authentication target public data corresponding to the authentication key B1k is referred to as O_T2_B1k. In addition, although not illustrated in FIG. 4A, the public memory 204 of the cartridge T2 also stores an identifier for each of the authentication keys A20 and B11 to B1n. Hereinafter, the identifier of the authentication key X is referred to as an identifier X_ID. The public memory 204 of the cartridge T2 further stores signature data Sig. The signature data corresponds to each second authentication key stored in the cartridge 100 and is stored in the public memory 204. For example, the cartridge T2 stores only the authentication key A20 as the second authentication key, and accordingly the cartridge T2 stores only the signature data for the authentication key A20. On the other hand, the cartridge T3 stores the authentication keys A20 and B20 as the second authentication key, and accordingly the cartridge T3 stores the signature data for the authentication key A20 and the signature data for the authentication key B20. The signature data Sig corresponding to the authentication key A20 held by the cartridge T2 is message-recovery type signature data that is concatenated data, message-recovery type signed with a secret key, of the authentication target public data O_T2_A20 and the identifier A20_ID of the authentication key A20. Note that the verification key corresponding to the secret key is stored in the verification unit 106 of the image forming apparatus 102.

FIG. 4B illustrates the information stored in the non-public memory 203 and the public memory 204 of the authentication unit 105 of the image forming apparatus P1. The non-public memory 203 of the image forming apparatus P1 stores authentication secret data corresponding to the authentication keys A20 and A1i (i is an integer from 1 to n). Hereinafter, as illustrated in FIG. 4B, the authentication secret data corresponding to the authentication key A20 held by the image forming apparatus P1 is referred to as S_P1_A20, and the authentication secret data corresponding to the authentication key A1i held by the image forming apparatus P1 is referred to as S_P1_A1i. The public memory 204 of the image forming apparatus P1 stores identifiers of the authentication keys A20 and A1i.

FIG. 4C illustrates information stored in the non-public memory 203 and the public memory 204 of the authentication unit 105 of the image forming apparatus P2. The non-public memory 203 of the image forming apparatus P2 stores authentication secret data corresponding to the authentication keys B20 and B1i (i is an integer from 1 to n). Hereinafter, as illustrated in FIG. 4C, the authentication secret data corresponding to the authentication key B20 held by the image forming apparatus P2 is referred to as S_P2_B20, and the authentication secret data corresponding to the authentication key B1i held by the image forming apparatus P2 is referred to as S_P2_B1i. The public memory 204 of the image forming apparatus P2 stores identifiers of the authentication keys B20 and B1i.

In the present embodiment, the authentication target secret data of the authentication key X stored in the cartridge 100 is generated by a one-way function with the authentication target public data of the authentication key X stored in the cartridge 100 and the authentication secret data of the authentication key X stored in the image forming apparatus as input. For example, when the authentication target secret data of the authentication key X is represented by TSX, the authentication target public data is represented by TOX, the authentication secret data is represented by PSX, and the one-way function is represented by f( ), the following equation holds.

$$TSX = f(PSX, TOX).$$

In terms of the authentication target secret data stored in the cartridge T2 illustrated in FIG. 4A, the following equations hold.

$$S\_T2\_A20 = f(S\_P1\_A20, O\_T2\_A20) \tag{1}$$

$$S\_T2\_B1i = f(S\_P2\_B1i, O\_T2\_B1i) \tag{2}$$

FIG. 5 is a flowchart of an authentication process executed by the control unit 104 in the present embodiment. The control unit 104 executes the process of FIG. 5 when the cartridge 100 is attached to the image forming device 102. At S10, the control unit 104 determines which of the first authentication key and the second authentication key of the authentication unit 105 of the image forming apparatus 102, and the first authentication key and the second authentication key of the cartridge 100 match. Specifically, at S10, the control unit 104 acquires from the cartridge 100 the identifier of the authentication key and the authentication target public data stored in the public memory 204. For example, it is assumed that the cartridge 100 is a cartridge T2. In this case, as illustrated in FIG. 4A, the control unit 104 acquires the identifiers A20_ID and B1k_ID of the authentication keys A20 and B1k (k is an integer from 1 to n) and the authentication target public data O_T2_A20 and O_T2_B1k. In addition, at S10, the control unit 104 acquires the identifier of the authentication key stored in the public memory 204 of the authentication unit 105, and compares this identifier with the identifier acquired from the cartridge 100 to determine which of the first authentication key and the second authentication key match. For example, in the case where the image forming device 102 is the image forming device P2, the identifiers of the authentication keys B20 and B1i are stored in the public memory 204 as illustrated in FIG. 4C. Accordingly, the control unit 104 determines that the authentication key B1i matches, or in other words, the first authentication key matches.

When a determination result at S10 is that the first authentication key matches, the control unit 104 authenticates the cartridge 100 on the basis of the matched first authentication key at S11. For example, it is assumed that the image forming device 102 is the image forming device P2, and the cartridge 100 is the cartridge T2. In this case, for example, the control unit 104 notifies the cartridge T2 that the authentication key B1$i$ is to be used. Also, the control unit 104 generates arbitrary data Msg and transmits the data Msg to the cartridge T2. The CPU 201 of the authentication target unit 101 of the cartridge T2 calculates response data R1 by a one-way function g( ) with the received Msg and the authentication target secret data S_T2_B1$i$ corresponding to the specified authentication key B1$i$ as input in accordance with the following Equation (3). Then, the CPU 201 transmits the calculation result to the image forming device P2.

$$R1 = g(S\_T2\_B1i, Msg) \qquad (3)$$

Likewise, the control unit 104 notifies the authentication unit 105 that the authentication key B1$i$ is to be used, and transmits the data Msg and the authentication target public data O_T2_B1$i$ corresponding to the authentication key B1$i$ acquired at S10 to the authentication unit 105. The CPU 201 of the authentication unit 105 generates the authentication target secret data S_T2_B1$i$ by the one-way function f( ) with the authentication secret data S_P2_B1$i$ corresponding to the specified authentication key B1$i$ and the received authentication target public data O_T2_B1$i$ as input in accordance with Equation (2). Then, the CPU 201 of the authentication unit 105 generates the response data R2 by a calculation in accordance with Equation (3) based on the generated authentication target secret data S_T2_B1$i$ and Msg, and transmits the calculation result to the control unit 104. At S15, the control unit 104 compares the response data R1 received from the cartridge T2 with the response data R2 received from the authentication unit 105. When the data match, the authentication of the cartridge T2 is determined to be successful, and when the data do not match, the authentication of the cartridge T2 is determined to be unsuccessful.

On the other hand, when the image forming device 102 is the image forming device P1, the identifiers of the authentication keys A20 and A1$i$ are stored in the public memory 204 as illustrated in FIG. 4B. Accordingly, at S10, the image forming device P1 determines that the authentication key A20 matches, or in other words, the second authentication key matches. When a determination result at S10 is that the second authentication key matches, the control unit 104 acquires, from the cartridge 100, the signature data Sig corresponding to the matching second authentication key stored in the public memory 204 to perform the verification of the data at S12. Specifically, the control unit 104 notifies the verification unit 106 of the signature data Sig acquired from the cartridge T2 and the authentication target public data O_T2_A20 and the identifier A20_ID of the authentication key A20. With the held verification key, the verification unit 106 performs verification of the validity of the signature data Sig, and recovery of the original data. When the signature data Sig is valid and the data recovered from the signature data Sig is concatenated data of the authentication target public data O_T2_A20 and the identifier A20_ID of the authentication key A20, the verification unit 106 determines that the verification is successful. Otherwise, the verification unit 106 determines that the verification is unsuccessful. The verification unit 106 notifies the control unit 104 of the verification result at S13. When the verification result notified from the verification unit 106 is unsuccessful, the control unit 104 determines that the authentication is failed. On the other hand, when the verification result notified from the verification unit 106 is successful, the control unit 104 performs authentication based on the second authentication key A20 at S14. Note that the authentication method using the second authentication key A20 is the same as the authentication method using the first authentication key described at S11.

In the present embodiment, one first authentication key used to authenticate the cartridge 100 of the same version and one second authentication key used to authenticate the cartridge 100 of the newer version are stored in the image forming device 102. On the other hand, a plurality of first authentication keys corresponding to the version of the cartridge 100 and a second authentication key corresponding to the previous version are stored in the cartridge 100. Note that the number of second authentication keys stored in the cartridge 100 depends on the number of the previous generations of the image forming device 102 allowed to use the cartridge 100. Specifically, in the case where the compatibility with q (q is an integer greater than or equal to 1) previous versions of the image forming device 102 is ensured, a total of q second authentication keys corresponding to the versions are stored in the cartridge 100.

The cartridge 100 includes a plurality of first authentication keys, and when it is attached to the image forming device 102 of the same version, authentication is performed using the first authentication key selected in accordance with that image forming apparatus 102. Accordingly, to successfully achieve the authentication with a certain image forming apparatus 102 of the same version, all the plurality of first authentication keys must be acquired, and thus the security level can be improved. Also, in this embodiment, to successfully achieve the authentication with the image forming apparatus 102 of a previous version, one second authentication key is stored instead of storing in the cartridge 100 of the new version the plurality of first authentication keys used for the previous version. Specifically, the authentication key A20 is stored in the cartridge T2 instead of storing the authentication keys A11 to A1$n$.

This is because the possibility of leakage of the authentication keys A11 to A1$n$ increases over time, and therefore using the authentication keys A11 to A1$n$ even after the release of the cartridge T2 to ensure compatibility leads to reduction in security level. Another reason is that storing in the cartridge 100 the first authentication keys of all the generations for ensuring the compatibility increases the memory capacity of the cartridge 100 and increases the cost of the cartridge 100. For example, in the case of a configuration of storing in the cartridge 100 the first authentication keys of all the generations for ensuring the compatibility, it is necessary to store additional 3n authentication keys in the cartridge 100 to ensure the compatibility with previous three generations. In this embodiment, the cartridge stores only one second authentication key for each generation, and thus it suffices to additionally store three second authentication keys in the cartridge 100 even when ensuring the compatibility with three previous generations.

In addition, while the second authentication key of a certain version (generation) is stored in the image forming apparatus 102 of the same version, that second authentication key is not stored in the cartridge 100 of the same version but is stored in the cartridge 100 released as a newer version. Thus, the security level can be improved since there is a lower risk of leakage of the second authentication key at the time of starting the authentication with the second authentication key of the previous version by version update.

Further, in the present embodiment, the signature data Sig corresponding to the second authentication key is stored in the cartridge 100, and, at the time of authentication with the second authentication key, the verification based on the corresponding signature data Sig is performed before performing the authentication. The secret key for generating the signature data Sig is not stored in the cartridge 100 or in the image forming apparatus 102. Note that while the image forming apparatus 102 verifies the signature data Sig with the verification key (public key) corresponding to the secret key, the secret key is secured even when the verification key is leaked. With this configuration, the reliability of the authentication with the second authentication key is improved.

Note that in the present embodiment, the signature data Sig is concatenated data, which includes both the authentication target public data and the identifier of the second authentication key and is message-recovery type signed with a secret key. However, any of the authentication target public data and the identifier of the second authentication key may be data that is message-recovery type signed with a secret key. Note that instead of the configuration in which the authentication target public data and the identifier have different values, the authentication target public data itself corresponding to the authentication key may be used as the identifier of the authentication key.

Second Embodiment

The following describes Second Embodiment mainly about differences from First Embodiment. In First Embodiment, the image forming apparatus 102 uses the first authentication key in the authentication of the cartridge 100 of the same version (generation), and uses the second authentication key in the authentication of the cartridge 100 of the previous version. However, the image forming apparatus 102 may be configured to use the first authentication key in the authentication of the cartridges 100 of a version from the same version to a predetermined number of previous versions where the generation change span is short. In this case, the image forming apparatus 102 uses the second authentication key to authenticate the cartridge 100 of a version older by one or more versions than the cartridges 100 of the predetermined previous versions. FIG. 6 illustrates a case where the image forming apparatus 102 uses the first authentication key in authentication of the same version and version older by one version, and uses the second authentication key in authentication of versions older by two or more versions. The authentication keys are stored in the image forming apparatuses P1 to P3 as in First Embodiment. Also, the authentication key is stored in the cartridge T1 as in First Embodiment. In contrast, in this embodiment, the cartridge T2 stores a total of 2n authentication keys, the authentication keys A11 to A1$n$ and B11 to B1$n$. The cartridge T3 stores total of 2n+1 authentication keys, namely, B11 to B1$n$ and C11 to C1$n$, and, A20.

With this configuration, the image forming apparatus P1 uses the authentication key A1$i$ (where i is an integer from 1 to n) when the cartridge T1 of the same version and the cartridge T2 of a version newer by one version are mounted. On the other hand, the image forming apparatus P1 uses the authentication key A20 in the authentication when the cartridge T3 of a version newer by two versions is mounted. Other configurations and authentication methods are the same as those of First Embodiment.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-141631, filed on Jul. 27, 2018, which is hereby incorporated by reference herein in its entirety.

What is claimed is:

1. An authentication system comprising an authentication device and an authentication target device, wherein
    the authentication device includes:
        a first memory configured to store one first secret data and one second secret data, the one first secret data to authenticate the authentication target device of a version from a first version that is the same as the authentication device to a second version newer than the first version, the one second secret data to authenticate the authentication target device of a version newer than the second version; and
        a first processor, and
    the authentication target device includes:
        a second memory configured to store a plurality pieces of first target secret data and one second target secret data, the plurality pieces of first target secret data corresponding to each of versions from a third version that is same as the authentication target device to a fourth version older than the third version and for authentication by the authentication device of a version from the third version to the fourth version, the one second target secret data corresponding to each of versions from a fifth version to a sixth version and for authentication by the authentication device of a version from the fifth version to the sixth version, the fifth version being older than the fourth version by one version, the sixth version being older than the fifth version; and
    wherein when the first version is any of the versions from the third version to the fourth version,
 the second processor of the authentication target device selects one first target secret data, out of the plurality of pieces of first target secret data, corresponding to the one first secret data among target secret data stored in the second memory, and calculates first response data using the one first target secret data, and
 the first processor of the authentication device selects the one first secret data among secret data stored in the first memory, and performs authentication of the authentication target device based on the first response data and the one first secret data, and
when the first version is any of the versions from the fifth version to the sixth version,
 the second processor of the authentication target device selects the one second target secret data among the target secret data stored in the second memory, and calculates second response data using the one second target secret data, and
 the first processor of the authentication device selects the one second secret data among the secret data stored in the first memory, and performs authentication of the authentication target device based on the second response data and the one second secret data,
wherein
the authentication target device further includes a third memory configured to store signature data corresponding to each of versions from the fifth version to the sixth version;
when the first version is any of the versions from the fifth version to the sixth version, the first processor of the authentication device acquires signature data corresponding to the first version from the authentication target device and verifies the signature data corresponding to the first version;
when verification of the signature data corresponding to the first version is successful, the first processor of the authentication device performs the authentication of the authentication target device based on the second response data and the one second secret data, and
when the first version is any of the versions from the third version to the fourth version, the first processor of the authentication device performs authentication of the authentication target device based on the first response data and the one first secret data without verifying the signature data.

2. An authentication system comprising an authentication device and an authentication target device, wherein
the authentication device includes:
 a first memory configured to store one first secret data to authenticate the authentication target device of a first version that is the same as the authentication device and one second secret data to authenticate the authentication target device of a version newer than the first version; and
 a first processor, and
the authentication target device includes:
 a second memory configured to store a plurality of first target secret data and one second target secret data, the plurality of first target secret data for authentication by the authentication device of a second version that is the same as the authentication target device, the one second target secret data corresponding to each of versions from a third version to a fourth version and for authentication by the authentication device of a version from the third version to the fourth version, the third version being older than the second version by one version, the fourth version being older than the third version; and
 a second processor,
wherein
when the first version is a same as the second version,
 the second processor of the authentication target device selects one first target secret data, out of the plurality of pieces of first target secret data, corresponding to the one first secret data among target secret data stored in the second memory, and calculates first response data using the one first target secret data, and
 the first processor of the authentication device selects the one first secret data among secret data stored in the first memory, and performs authentication of the authentication target device based on the first response data and the one first secret data, and
when the first version is any of the versions from the third version to the fourth version,
 the second processor of the authentication target device selects the one second secret data among the secret data stored in the first memory, and calculates second response data using the one second target secret data, and
 the first processor of the authentication device selects the one second secret data among the secret data stored in the first memory, and performs authentication of the authentication target device based on the second response data and the one second secret data
wherein
the authentication target device further includes a third memory configured to store signature data corresponding to each of versions from the third version to the fourth version;
when the first version is any of the versions from the third version to the fourth version, the first processor of the authentication device acquires signature data corresponding to the first version from the authentication target device and verifies the signature data corresponding to the first version;
when verification of the signature data corresponding to the first version is successful, the first processor of the authentication device performs the authentication of the authentication target device based on the second response data and the one second secret data, and
when the first version is the second version that is the same as the authentication target device, the first processor of the authentication device performs authentication of the authentication target device based on the first response data and the one first secret data without verifying the signature data.

3. An authentication device comprising:
one or more memories configured to store secret data corresponding to a first authentication key of a first version, secret data corresponding to a second authentication key of the first version, and one or more programs; and
one or more processors,
wherein the one or more programs, when executed by the one or more processors, cause the one or more processors to perform:
 communicating with an authentication target device to determine whether the authentication target device is a first authentication target device or a second authentication target device, the first authentication target device storing target secret data corresponding to the first authentication key of the first version and target secret data corresponding to the second authentication key of a second version older than the first version, the second authentication target device storing target secret data corresponding to the first authentication key of a third version newer than the first version and target secret data corresponding to the second authentication key of the first version;

in accordance with a determination that the authentication target device is the first authentication target device,
  obtaining first response data based on the target secret data corresponding to the first authentication key of the first version from the authentication target device,
  selecting the secret data corresponding to the first authentication key of the first version, and
  authenticating the authentication target device based on the secret data corresponding to the first authentication key of the first version and the first response data; and in accordance with a determination that the authentication target device is the second authentication target device,
  obtaining second response data based on the target secret data corresponding to the second authentication key of the first version from the authentication target device,
  selecting the secret data corresponding to the second authentication key of the first version, and
  authenticating the authentication target device based on the secret data corresponding to the second authentication key of the first version and the second response data, wherein the one or more programs, when executed by the one or more processors, further cause the one or more processors to perform:

in accordance with the determination that the authentication target device is the second authentication target device,
  obtaining signature data from the authentication target device before authenticating the authentication target device,
  verifying the signature data, and
  when verification of the signature data is successful, authenticating the authentication target device, and in accordance with the determination that the authentication target device is the first authentication target device,
  authenticating the authentication target device without obtaining and verifying the signature data.

4. The authentication device according to claim 3, wherein the one or more programs, when executed by the one or more processors, cause the one or more processors to perform:

in accordance with the determination that the authentication target device is the first authentication target device,
  obtaining public data corresponding to the first authentication key of the first version from the authentication target device, the target secret data correspond to the first authentication key of the first version being generated by a one-way function with the secret data corresponding to the first authentication key of the first version and the public data corresponding to the first authentication key of the first version as input; and
  authenticating the authentication target device by comparing the first response data with a calculation result based on the secret data corresponding to the first authentication key of the first version and the public data corresponding to the first authentication key of the first version.

5. The authentication device according to claim 3, wherein the one or more programs, when executed by the one or more processors, cause the one or more processors to perform:

in accordance with the determination that the authentication target device is the second authentication target device,
  obtaining public data corresponding to the second authentication key of the first version from the authentication target device, the target secret data corresponding to the second authentication key of the first version being generated by a one-way function with the secret data corresponding to the second authentication key of the first version and the public data corresponding to the second authentication key of the first version as input; and
  authenticating the authentication target device by comparing the second response data with a calculation result based on the secret data corresponding to the second authentication key of the first version and the public data corresponding to the second authentication key of the first version.

6. The authentication device according to claim 5, wherein the signature data is message-recovery type signature data of data including at least one of an identifier of the secret data corresponding to the second authentication key of the first version and the public data corresponding to the second authentication key of the first version.

7. An image forming apparatus configured to mount a cartridge, comprising:
  one or more memories configured to store secret data corresponding to a first authentication key of a first version, secret data corresponding to a second authentication key of the first version, and one or more programs; and
  one or more processors,
  wherein the one or more programs, when executed by the one or more processors, cause the one or more processors to perform:
  when the cartridge is mounted, communicating with the cartridge to determine whether the cartridge is a first cartridge or a second cartridge, the first cartridge storing target secret data corresponding to the first authentication key of the first version and target secret data corresponding to the second authentication key of a second version older than the first version, the second cartridge storing target secret data corresponding to the first authentication key of a third version newer than the first version and target secret data corresponding to the second authentication key of the first version;

in accordance with a determination that the cartridge is the first cartridge,
  obtaining first response data based on the target secret data corresponding to the first authentication key of the first version from the cartridge,
  selecting the secret data corresponding to the first authentication key of the first version, and
  authenticating the cartridge based on the secret data corresponding to the first authentication key of the first version and the first response data; and in accordance with a determination that the cartridge is the second cartridge, obtaining second response data based on the target secret data corresponding to the second authentication key of the first version from the cartridge, selecting the secret data corresponding to the second authentication key of the first version, and authenticating the cartridge based on the secret data corresponding to the second authentication key of the first version and the second response data, wherein the one or more memories are further configured to store signature data, and wherein the one or more programs, when executed by the one or more processors, further cause the one or more processors to perform:

in accordance with the determination that the cartridge is the second cartridge, transmitting the signature data to the cartridge, and in accordance with the determination that the cartridge is the first cartridge, not transmitting the signature data to the cartridge.

8. An authentication target device comprising:

one or more memories configured to store a plurality pieces of target secret data respectively corresponding to a plurality of first authentication keys of a first version, target secret data corresponding to a second authentication key of a second version older than the first version, and one or more programs; and one or more processors, wherein the one or more programs, when executed by the one or more processors, cause the one or more processors to perform:

communicating with an authentication device to determine whether the authentication device is a first authentication device or a second authentication device, the first authentication device storing secret data corresponding to a first authentication key of the first version among the plurality of first authentication keys of the first version and secret data corresponding to the second authentication key of the first version, the second authentication device storing secret data corresponding to the first authentication key of the second version and secret data corresponding to the second authentication key of the second version;

in accordance with a determination that the authentication device is the first authentication device, selecting target secret data corresponding to a first authentication key of the first version, which corresponds to the secret data corresponding to the first authentication key of the first version stored in the authentication device, as selected target secret data among the plurality pieces of target secret data respectively corresponding to the plurality of first authentication keys of the first version, performing a calculation based on the selected target secret data, and transmitting a result of the calculation to the authentication device, and in accordance with a determination that the authentication device is the second authentication device, selecting the target secret data corresponding to the second authentication key of the second version as selected target secret data, performing a calculation based on the selected target secret data, and transmitting a result of the calculation to the authentication device, wherein the one or more memories are further configured to store signature data, and wherein the one or more programs, when executed by the one or more processors, further cause the one or more processors to perform:

in accordance with the determination that the authentication device is the second authentication device, transmitting the signature data to the authentication device, and in accordance with the determination that the authentication device is the first authentication device, not transmitting the signature data to the authentication device.

9. The authentication target device according to claim 8, wherein the one or more memories are further configured to store a plurality of pieces of public data respectively corresponding to the plurality of first authentication keys of the first version and public data corresponding to the second authentication key of the second version;

wherein the one or more programs, when executed by the one or more processors, cause the one or more processors to perform:

in accordance with the determination that the authentication device is the first authentication device, transmitting, to the authentication device, public data corresponding to a first authentication key of the first version among the plurality pieces of public data respectively corresponding to the plurality of first authentication keys of the first version, wherein the public data corresponding to the first authentication key of the first version corresponds to the secret data corresponding to the first authentication key of the first version stored in the authentication device; and in accordance with the determination that the authentication device is the second authentication device, transmitting, to the authentication device, the public data corresponding to the second authentication key of the second version.

10. The authentication target device according to claim 9, wherein the signature data is message-recovery type signature data of data including at least one of an identifier of the target secret data corresponding to the second authentication key of the second version and the public data corresponding to the second authentication key of the second version.

11. The authentication target device according to claim 8, wherein the authentication target device is a cartridge that is detachable from an image forming apparatus.

* * * * *